Dec. 12, 1944.　　　　J. L. TURNER　　　　2,364,930
FLOW METER
Filed July 21, 1943　　　　2 Sheets-Sheet 1

Inventor
Jacob L. Turner
by Roberts Cushman & Woodberry
att'ys.

Dec. 12, 1944.  J. L. TURNER  2,364,930
FLOW METER
Filed July 21, 1943  2 Sheets-Sheet 2

Inventor
Jacob L. Turner
by Roberts Cushman Woodberry
att'ys.

Patented Dec. 12, 1944

2,364,930

UNITED STATES PATENT OFFICE 2,364,930

FLOWMETER

Jacob Lee Turner, Norwell, Mass., assignor to Manning, Maxwell & Moore, Incorporated, New York, N. Y., a corporation of New Jersey Application July 21, 1943, Serial No. 495,596

10 Claims. (Cl. 73—205)

This invention pertains to apparatus for use in measuring the volume of fluid which passes through a conduit in a given unit of time, and relates more particularly to a fluid flow meter of the orifice type.

Flow meters, as heretofore devised, have not always been as accurate as might be desired; they have commonly comprised a substantial number of moving parts, sometimes quite delicate and exposed to the corrosive action of the flowing fluid; they have been expensive to make and to maintain in operative condition; they have not always been readily adaptable for use with fluids of different viscosities; and in many instances they have been cumbersome and space consuming.

The principal object of the present invention is to provide a flow meter which is accurate and reliable; which is simple in construction and comprises a minimum number of moving parts exposed to the fluid; to provide a flow meter which is very sensitively responsive to changes in fluid velocity; which is inexpensive to make and to maintain; which is of small external dimensions; which may readily be calibrated for use with fluids of different viscosities; and which is rugged and capable of withstanding hard usage or exposure to difficult working conditions, without substantial loss of accuracy.

Other and further objects and advantages of the invention will be pointed out in the following more detailed description and by reference to the accompanying drawings wherein.

Figure 1:
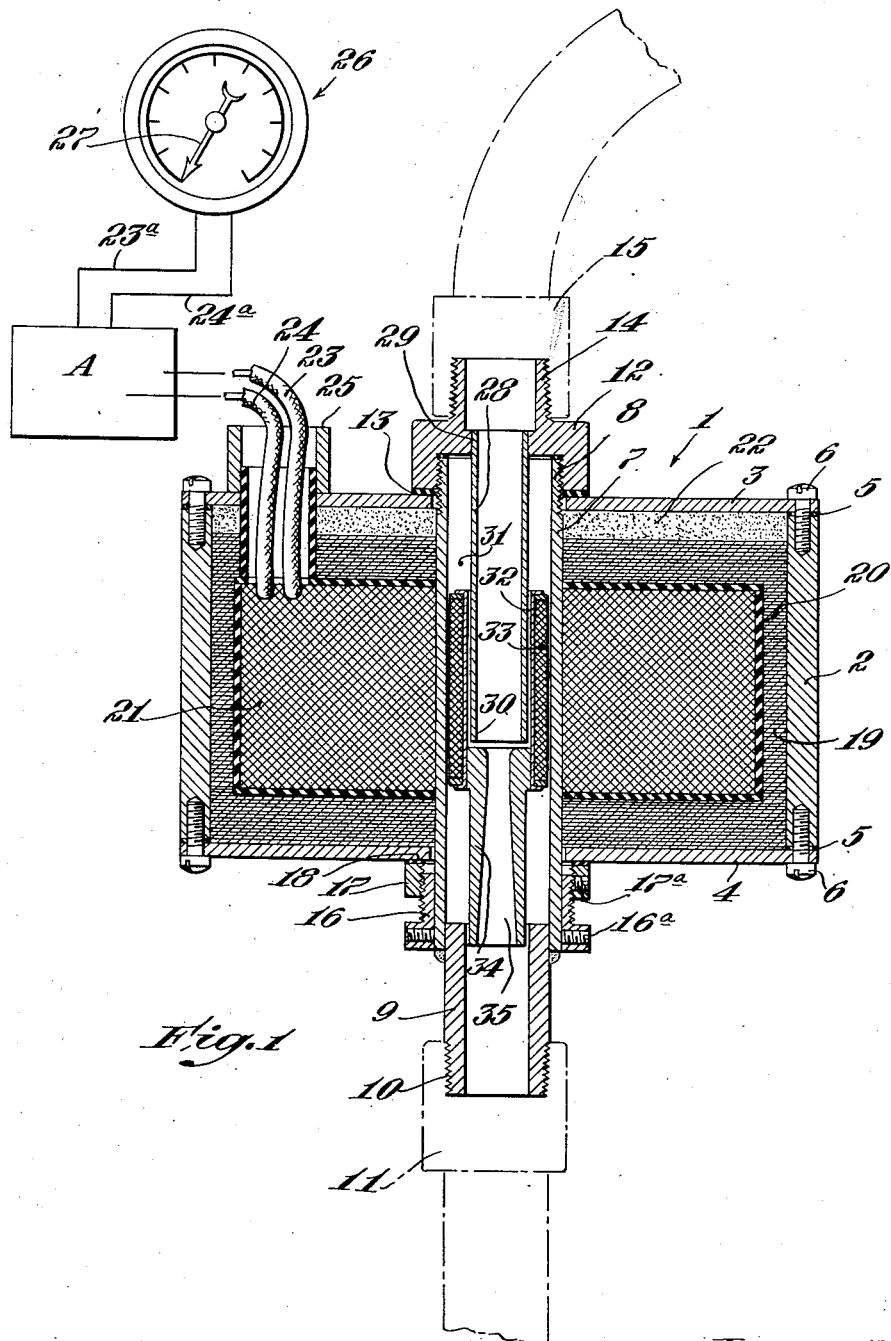
Fig. 1 is a vertical, diametrical section of the flow meter proper, the indicating means being shown diagrammatically in elevation.
Figure 2:
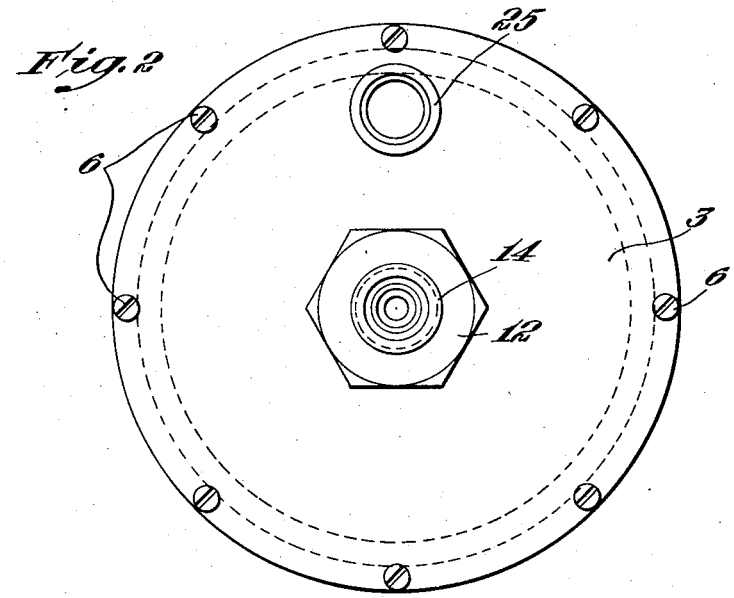
Fig. 2 is a plan view of the flow meter proper, the indicating means being omitted.
Figure 3:
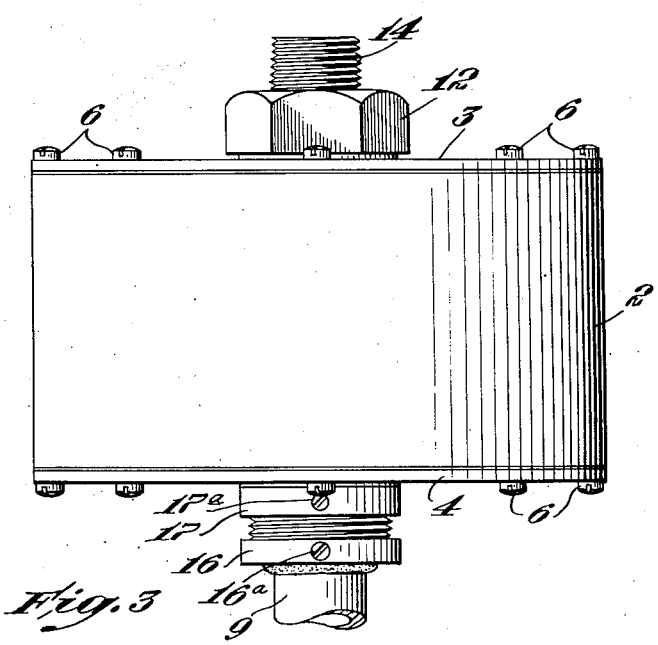
Fig. 3 is a front elevation of the device shown in Fig. 2.

Referring to the drawings, the numeral 1 indicates the meter proper, which comprises a fluid-tight outer casing, here shown as including the cylindrical shell 2 and the annular top and bottom plates 3 and 4. Gaskets 5 are interposed between the plates 3 and 4 and the upper and lower edges, respectively, of the cylindrical shell 2, and the planes 3 and 4 are secured to the shell by means of bolts 6. A tubular core member 7 of non-magnetic material extends through the central apertures of the plates 3 and 4, the core member 7 being screw-threaded at 8 where it projects above the plate 3 and having an extension 9 welded to its lower end where it projects below the plate 4. The extension 9 is externally screw-threaded at 10 for the reception of a delivery pipe 11.

An inlet fitting 12 is secured to the screw-threaded upper end 8 of the core 7, a gasket 13 being interposed between the fitting and the upper plate 3 of the casing. The fitting 12 is screw-threaded at its upper end, as shown at 14, for the reception of a supply pipe 15.

Clamping means is secured to the lower portion of the core 7 below the plate 4, such clamping means including an externally screw-threaded sleeve 16 which is fixed to the core 7 by means of set screws 16ª, and an axially movable collar 17 having threaded engagement with the sleeve 16 and which is designed to apply pressure to a gasket 18 interposed between it and the lower surface of the plate 4, thereby to provide leak-tight connection between the core 7 and the casing. The collar 17 may be provided, if desired, with a set screw 17ª for retaining it in adjacent position.

Within the casing, defined by the shell 2 and the top and bottom plates 3 and 4, there is arranged an electromagnet comprising a large number of thin laminations 19 of magnetic iron or the like arranged to define a central chamber which is provided with an insulating lining 20, and within which is arranged the magnet coil 21. Conductors 23 and 24 lead from the terminals of this coil 21 out through a tubular connector 25 welded to the top plate 3. The space within the casing which is not occupied by the magnet coils may be filled with a suitable water-resistant compound 22 which may also, if desired, be arranged to fill the tubular connector 25, thereby to prevent the entrance of moisture into the interior of the casing. An appropriate indicating instrument 26, for instance an ammeter, watt meter, or the like, having a pointer or index 27, responsive to variations in magnetic flux in the coil 21, is connected to the conductors 23, 24, directly, if the intensity of fluctuation be sufficiently great, or indirectly, through an appropriate amplifier A and conductors 23ª, 24ª, if the intensity of magnetic flux be too small to affect the indicating instrument without amplification. The dial of this instrument 26 may be indexed or graduated in any desired units, but preferably so as directly to indicate the rate of flow through the meter.

Within the core 7 and coaxial therewith is a tubular guide 28 of rigid non-magnetic material, the upper end 29 of this guide being fixed, for example, by screw-threading or welding to the inlet fitting 12, the opposite end 30 of this tubular guide being unsupported and being located at a point intermediate the ends of the core 7. The external diameter of the tubular guide 28 is such as to provide an annular chamber 31 between it and the inner wall of the core 7. A sleeve 32, preferably of non-magnetic material, is arranged to slide freely on the tubular guide 28. On this sleeve is mounted an annular armature 33, consisting, for example, of a series of laminations of magnetic iron or alternatively of a closed-circuit coil, and to the lower end of the sleeve is secured an orifice device, here shown as a nozzle type orifice 34 having a diverging bore 35.

When fluid is supplied through the pipe 15 to the inlet fitting 12, it passes down through the tubular guide 28 and through the nozzle 34, and is discharged by the latter into the extension 9 and then passes to the delivery pipe 11. The nozzle 34 is so shaped and dimensioned as to impose a predetermined degree of resistance to the flow of fluid through the apparatus, and thus the nozzle or orifice device is subjected to a dragging action or force tending to move it downwardly, that is to say, in the direction of fluid flow. Such downward movement of the nozzle is opposed by the armature 33 which tends to remain in that portion of the field of the magnet 21 at which the magnet flux is at a maximum. However, this tendency is to a variable degree overcome by the action of the flowing fluid which displaces the armature 33 from its normal central position in direct proportion to the velocity of flow of the fluid. Such displacement causes a change in the intensity of the magnetic field and thus causes a slight variation in the magnetic flux in coil 21, and such fluctuation is indicated by the instrument 26. As above pointed out, by proper calibration of the parts, the instrument 26 may thus be caused to show directly the velocity of flow of fluid through the apparatus, or, if preferred, the amount of fluid flowing per unit of time. By providing the device with nozzles 34 of different shapes and sizes, it is readily possible to adapt the instrument to indicate the rate of flow of fluids of widely different viscosities, or, on the other hand, without change in the nozzle, the apparatus may be calibrated for fluids of different viscosities by a change in the graduations of the dial of the indicator 26.

While one desirable embodiment of the invention has herein been illustrated by way of example, it is to be understood that the invention is not necessarily limited to this precise embodiment but is to be regarded as broadly inclusive of any or all modifications and equivalents which fall within the scope of the appended claims.

I claim:

1. A fluid flow meter comprising an inlet fitting, an outlet fitting axially aligned therewith, a fixed tubular guide coaxial with the inlet fitting and arranged to receive the fluid which enters the latter, a sleeve arranged to slide freely on the guide, a nozzle carried by the sleeve and arranged to receive the fluid discharged through the guide, an armature mounted on the sleeve, a tubular core extending from the inlet fitting to the outlet fitting and which houses the sleeve and armature, an electromagnet including a coil which embraces the core, means for amplifying fluctuations in the magnetic flux in the field of the electromagnet, and flow-indicating means responsive to said amplified fluctuations.

2. A fluid flow meter comprising a fluid-tight casing, an electromagnet in said casing and including a coil and an imperforate tubular core whose opposite ends project fluid-tight from the casing, a movable part within the core, means responsive to fluid flow through said core to move said part in the same direction as fluid passing longitudinally through the core, a guide for said movable part, said guide being coaxial with and within the tubular core, the guide being of lesser diameter than the core tube and being fixed at one end relatively to the core tube, there being an annular space between the guide and the core tube, said movable part being disposed within the said annular space, an annular armature secured to said movable part and within the field of the magnet, and means for indicating variations in magnetic flux in the coil of the magnet.

3. A fluid flow meter comprising a fluid-tight casing, an electromagnet in said casing and including a coil and a tubular core projecting fluid-tight from opposite sides of the casing, a nozzle type orifice device coaxial with and within the core, said orifice device being freely movable and tending to move in the same direction as fluid passing longitudinally through the core, a rigid guide for the orifice device, a closed coil armature secured to the orifice device and coaxial with the core, and means for indicating fluctuations in the intensity of magnetic flux in the magnet coil resultant from axial movement of said closed coil armature.

4. A fluid flow meter comprising a tubular core having mounted thereon an electromagnet winding, a sleeve having an annular armature mounted thereon, the sleeve being arranged to move freely within the core, means for guiding said sleeve to move axially, an orifice member secured to one end of the sleeve, means for delivering fluid to flow through the orifice member, the latter tending to retard the flow whereby the orifice member tends to move in the direction of fluid flow, means for amplifying resultant variations in magnetic flux in the field of the magnet, and indicating means calibrated to indicate rate of flow, said indicating means being responsive to said amplified fluctuations in magnetic flux in the field of the electromagnet.

5. A fluid flow meter comprising a fluid-tight casing, an electromagnet in said casing and including a coil and having a tubular core whose opposite ends project from the casing, an inlet fitting attached to one projecting end of the core, means for connecting a delivery pipe to the opposite end of the core, a fixed tubular guide coaxial with and within the core, there being an annular chamber between the core and guide, a sleeve freely slidable on the guide within said chamber, an armature mounted on the sleeve, an orifice device fixed to the sleeve and through which the fluid must pass on its way from the inlet fitting to the delivery pipe, means for amplifying variations in magnetic flux in the magnet coil, and indicating means responsive to said amplified variations.

6. A fluid flow meter comprising a tubular core screw-threaded at opposite ends, an inlet fitting secured to one end of the core, clamping means mounted on the core adjacent to its opposite end, a rigid, fluid-tight casing mounted on the core between the fitting and the clamping means, said core having an electromagnet including a coil mounted thereon, a tubular guide fixed at one end to the fitting, said guide being of substantially less diameter than the core, thereby providing an annular chamber between them, a sleeve freely slidable on the guide, an armature mounted on the sleeve within said chamber, a nozzle type orifice device coaxial with and carried by the sleeve, amplifying means connected to the terminals of the electromagnet coil, and an indicator calibrated to indicate rate of flow through the orifice device, said indicator being responsive to the amplified variations in magnetic flux in the magnet coil.

7. A fluid flow meter comprising a rigid housing having a tubular core extending through it from one side to the other, an inlet fitting attached to one end of the core, a delivery pipe attached to the other end of the core, a tubular guide of smaller diameter than the core fixed at one end to the inlet fitting and terminating at a point intermediate the ends of the core, a sleeve freely slidable on the guide, a nozzle type orifice device fixed to the end of the sleeve and arranged to receive all fluid passing through the tubular guide, a closed-circuit coil mounted on the sleeve, a magnet coil mounted on the core within the housing, means for amplifying variations in magnetic flux in the magnetic coil, and indicating means responsive to such amplified variations.

8. A fluid flow meter having a fluid-tight casing comprising top and bottom walls, an imperforate open ended core tube extending through the casing from top to bottom and secured fluid-tight to the top and bottom walls respectively of the casing, a tubular rigid guide, coaxial with and within the core tube, the guide being fixedly supported at its upper end, its lower end being free, the guide defining the upper part of a fluid passage, an orifice device within the core tube, coaxial with the latter and having a longitudinal passage aligned with that in the guide tube, said orifice device being axially movable and tending by reason of the drag of the flowing fluid to move in the direction of fluid flow, an armature fixed to the orifice device, means within the casing and outside of the core tube for establishing a magnetic field reacting with said armature to oppose such axial movement of the orifice device, and means for indicating fluctuations in the magnetic field resultant from axial movement of the orifice device.

9. A fluid flow meter having a fluid-tight casing comprising annular top and bottom walls, a rigid imperforate core tube extending through the top and bottom walls of the casing and united leak-tight to said walls, means for securing an inlet conduit to the upper end of the core tube, means for securing a delivery conduit to the lower end of the core tube, a tubular rigid guide within the upper part of the core tube, means fixedly supporting the tubular guide at its upper end, it slower end being free, an annular armature freely embracing the tubular guide and disposed in the annular space between the tubular guide and the core tube, and an orifice device axially aligned with the tubular guide and having its upper end normally adjacent to the lower end of the tubular guide and connected to said armature, an electromagnet within the casing but outside of the core tube, said magnet being operative to establish a field which reacts with the armature and thereby tends to hold the orifice device in normal position, and means for indicating fluctuations in the intensity of said magnet field resultant from downward movement of the orifice device in response to the drag of fluid flowing downwardly through the latter.

10. A fluid flow meter comprising a fluid-tight casing, an imperforate core tube passing leak-tight through the casing from one side to the opposite side of the latter, means for connecting a supply conduit to one end of the core tube, and means for connecting a delivery conduit to the opposite end of the core tube, an electromagnet coil within the casing and embracing the core tube, a tubular open ended guide coaxial with and fixed within the core tube, a sleeve arranged to slide freely along said guide, the sleeve being interposed between the guide and the inner surface of the core tube, an orifice device carried by the sleeve, the orifice device having a passage so shaped that fluid flowing therethrough exerts a force tending to move the orifice device and sleeve axially of the core tube, an annular armature embracing the sleeve, said electromagnetic coil establishing a magnetic field about the armature, and means for indicating fluctuations in said magnetic field.

JACOB LEE TURNER.